June 18, 1935. P. M. BOURDON 2,004,922
TWIN TIRE CONSTRUCTION FOR VEHICLES
Filed April 7, 1934
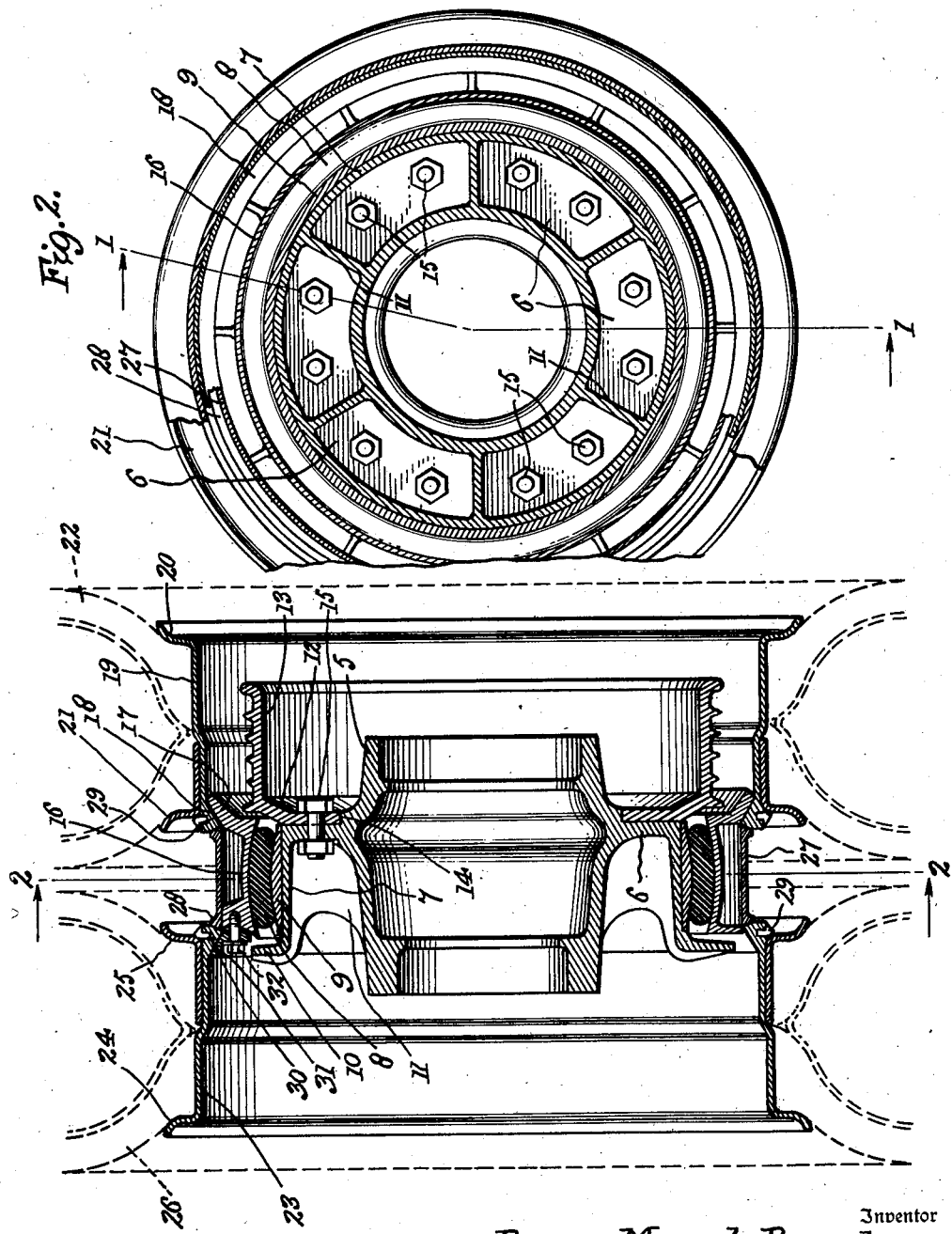
Inventor
Pierre Marcel Bourdon
By Wilkinson & Mawhinney
Attorneys.

Patented June 18, 1935

2,004,922

UNITED STATES PATENT OFFICE 2,004,922

TWIN TIRE CONSTRUCTION FOR VEHICLES

Pierre Marcel Bourdon, Paris, France, assignor to Michelin et Cie, Clermont-Ferrand, France, a corporation of France Application April 7, 1934, Serial No. 719,571

5 Claims. (Cl. 152—36)

The present invention relates to improvements in twin-tire construction for vehicles, and consists in certain improvements in the construction illustrated and described in my prior co-pending application entitled Mounting of twin-tired wheels, Serial No. 658,627, filed February 25, 1933, which matured as Patent No. 1,996,140, April 2, 1935, and in my application Arrangement for balancing loads carried by twin-tires, Serial No. 662,586, filed March 24, 1933, which matured as Patent No. 1,974,009, Sept. 18, 1934.

In common with the objects of those prior applications it is the purpose of the present invention to provide a resilient mounting for the twin-tire carrier to permit of a lateral movement of the carrier whereby the treads of both of the twin-tires may at all times be in active contact with the road surface without regard to the rounded or irregular character of that surface to the end that both tires may share equally in supporting the load.

The present construction deals with certain modifications of hub, cushion support and brake drum constructions, which are the commercial constructions adopted in actual practice.

The invention also has for its further object the provision of an improved form of rim carrier and rim securing device for holding the rims in spaced relation upon the carrier and in mounting the carrier in place upon the cushion for limited movement thereon.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a vertical section taken on the line 1—1 in Figure 2, showing a twin rim and hub supporting construction according to the present invention, and Figure 2 is a vertical section taken on the line 2—2 in Figure 1.

Referring more particularly to the drawing, 5 designates generally a hub having the hub flange 6 extending outwardly therefrom and carrying the ring 7, which constitutes the seat for the resilient supporting member or cushion 8. This seat 7 may receive a base ring 9 having a flat surface in contact with the ring 7, and having a convex surface outermost to mate with the concave surface of the inner cushion 8.

At the outside edge of the ring 7 is an outstanding flange 10 acting as an abutment to confine the cushion and rim carrier against excessive lateral motion. Reinforcing ribs 11 are cast on the hub, hub flange 6, ring 7 and flange 10 for the purpose of reinforcing and strengthening the construction.

At the other or inner side, the cushion and the rim carrier are confined by the flange 12 of the brake drum 13, which flange lies against the inner surface of the hub flange 6, seats upon the shoulder 14 of the hub, and is secured to the hub flange by the bolts or other fastening means 15. The outer surface of the cushion 8 is rounded transversely, or in other words, is convex, and the inner surface of the rim carrier ring 16 is concave to fit closely thereon. Such carrier is formed with an oblique fixed flange 17 adapted to mate with the correspondingly formed oblique wall 18 on the inner rim 19. This rim 19 has a fixed flange 20 and a demountable flange 21 for securing the pneumatic or other tire 22 in place.

The outer rim 23 is provided with an outer fixed flange 24 and an inner detachable flange 25 for holding in place the outer pneumatic or other tire 26. The rims 19 and 23 are held spaced apart by a spacing transversely split ring 27 of metal or other appropriate material, having reinforced and inclined ends 28, the inclinations of the ends converging outwardly in a radial direction, and such inclined ends adapted to fit against the similarly inclined ends of the downwardly enlarged portions 29 and 30 of the twin rims 19 and 23. This spacing ring 27 may rest at both its circumferential edges upon the flanges of the carrier ring 16.

Lugs 31 are secured by bolts, or other fastenings, 32 to the outer flange of the carrier ring 16, and such lugs are formed with inner inclined surfaces adapted to bear against the inclined surfaces on the thickened portion 30 of the rim 23.

In the use of the device, the rubber or other cushion member 8 interposed between the hub and the rim carrier will permit a lateral movement of the rim carrier and the twin rims 19 and 23, supported thereby, so that the tread surface of the two tires 22 and 26 may accommodate themselves to various contours of road surfaces, and the weight or load be supported evenly at all times by both tires. When a tire becomes deflated or has to be removed and replaced for any purpose, the bolts 32 and lugs 31 are removed, which permits the entire twin rim assembly, including the spacing ring 27 to be slid outwardly, whereby access may be had to either tire and rim. The spacing ring 27 may be free of both the carrier 16 and the two rims 19 and 23, but, when in place, it takes the lateral thrust of the bolts 32 and lugs 31 and holds the two rims in proper spaced apart relation.

The bed ring 9, cushion 8 and carrier ring 16 are mounted in place over the seating ring 7 before the brake drum 13 is put in place. When such brake drum is mounted in place and secured by the bolts 15, the brake drum flange 12 will retain the assembly and provide a limiting stop for excessive lateral motion inwardly.

It will be obvious that various changes in the construction, combination and arrangement of parts could be made which could be used without departing from the spirit of my invention, and I do not mean to limit the invention to such details, except as particularly pointed out in the claims.

Having thus described my invention, what I claim and desire to secure by Letters Patent of the United States is:

1. In a twin-tire mounting construction, a hub having a hub flange, a seating ring carried by the hub flange, a resilient member supported by said seating ring, a twin-tire carrier supported for laterally shiftable movement on said resilient member, a brake drum having a flange secured to said hub flange for confining the resilient member and rim carrier at the inner side of the wheel, and means on the seating ring for confining the tire carrier and resilient member at the outer side of the wheel.

2. In a twin-tire mounting construction, a hub having a hub flange, a seating ring supported by said hub flange and having a flange extending outwardly at the outer portion of the seating ring, a resilient member supported by said seating ring, a twin-tire carrier supported for lateral adjustable motion on said resilient member and a brake drum having a flange adapted to be removably secured to said hub flange and overlapping the resilient member and tire carrier at the inner side of the wheel.

3. In a twin-tire mounting construction, a hub having a hub flange, a seating ring carried by the hub flange and having a confining flange extending outwardly therefrom at its outer edge portion, reinforcing means for the flanges and seating ring, a resilient member supported by said seating ring, a twin-tire carrier supported for lateral shiftable movement on said resilient member, a brake drum having a flange overlapping said hub flange, resilient member and tire carrier, and fitting against the inner face of said hub flange, and fastening means for removably securing said brake drum flange to the hub flange.

4. In a twin-tire mounting construction, a hub having a hub flange, a seating ring supported by said hub flange and extending outwardly therefrom and having at its outer edge portion an outstanding fixed confining flange, reinforcing means for the hub and for said flanges and seating ring, a bed ring on the seating ring having a convex outer face, a resilient member having a concave inner face seated on the convex face of the bed ring, said resilient member having a convex outer face, a twin-tire carrier having a concave inner face seated on the convex outer face of said resilient member, a brake drum having a flange overlapping said hub flange and twin-tire carrier and spaced from the tire carrier and from said resilient member, and fastening means for securing said brake drum flange to the inner side of the hub flange.

5. In a twin-tire mounting construction, a hub construction, a seat on the hub construction, annular confining flanges at opposite sides of said seat, the outer confining flange being permanent, the inner confining flange being detachably connected to the hub construction, a twin-tire carrier member outwardly and radially spaced from said seat and narrower than the space between said flanges being overlapped radially by said flanges, and an annular resilient member between said seat and carrier and of less width than the distance between said flanges to permit of limited lateral rocking movement of the carrier member with respect to the seat as confined by said flanges.

PIERRE MARCEL BOURDON.